UNITED STATES PATENT OFFICE.

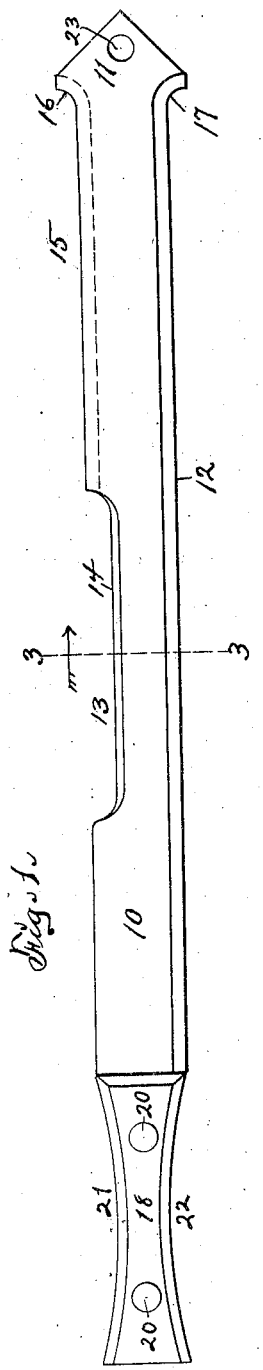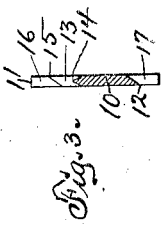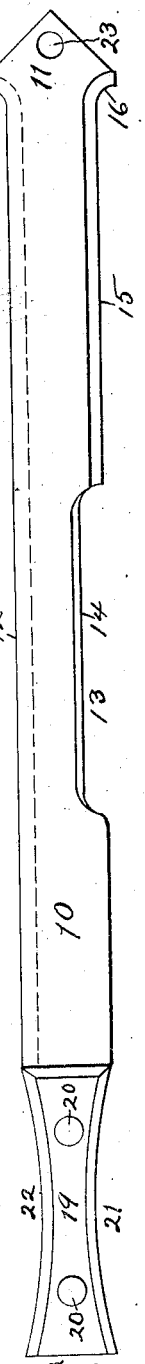

JOSEPH JAMES FLEMING, OF BOONE, IOWA, ASSIGNOR OF ONE-HALF TO R. ALBERG, OF BOONE, IOWA.

CORN-KNIFE.

1,355,828.  Specification of Letters Patent.  Patented Oct. 19, 1920.

Application filed October 11, 1919. Serial No. 330,033.

*To all whom it may concern:*

Be it known that I, JOSEPH J. FLEMING, citizen of the United States of America, and resident of Boone, Boone county, Iowa, have invented a new and useful Corn-Knife, of which the following is a specification.

The object of this invention is to provide an improved tool for use in harvesting corn, cane and similar crops.

A further object of this invention is to provide improved means for cutting fodder and ear corn.

A further object of this invention is to provide improved means for picking up down stalks of corn, cane and like growing crops.

A further object of this invention is to provide an improved handle for a knife of the class described.

A further object of this invention is to provide an improved point and suspending hole for a knife of the class described.

My invention consists in the construction and arrangement of elements hereinafter set forth, pointed out in the claims and illustrated by the accompanying drawing, in which—

Figure 1 is a face view of one side and Fig. 2 a face view of the opposite side of a knife embodying my improvements. Fig. 3 is a cross-section on the indicated line 3—3 of Fig. 1.

In the construction of the device as shown, the numeral 10 designates a blade made of metal such as tempered steel and of uniform width and thickness throughout its length, except as hereinafter pointed out. The blade 10 is formed with a pointed end portion 11, substantially of equilateral-triangular form, the base of the triangle being of greater width than and projecting or extending equally in opposite directions from the edges of the blade. One margin of the blade 10 is beveled on one side only and sharpened to form a cutting edge 12 continuous from the point portion 11 to the handle hereinafter described, and said edge 12 is useful in cutting standing corn and heavy stalks and brush because of its length and straightness. The opposite margin of the blade 10 is formed with a notch 13 of considerable length at or near its central portion, and the margin of the blade within said notch is beveled on both sides to form a breaking and cutting edge 14, which is useful in comminuting fodder and ear corn on a block or similar wooden anvil. The portion of the latter margin between the notch and the handle is blunt. The portion of the latter margin between the notch and the point 11 is beveled on one side only, parallel with the bevel of the opposite margin, to form a cutting edge 15. The cutting edges 12 and 15 are curved at their outer ends and merge into the base of the point portion 11, thus forming 90 degree hooks 16, 17, which are useful in lifting or picking up recumbent or "down" stalks of corn, cane and the like. The edge 15 is useful in cutting cane and other stalks offering less resistance than ordinary corn and, for that reason, may be of less length than the edge 12. The shank of the blade 10 is overlaid by opposite handle plates 18, 19, which plates are secured to the shank by rivets 20. Arcuate notches 21, 22 are formed in side margins of the shank and handle plates, thus reducing the width thereof at the center and providing a better fit for the hand of the user and a more convenient grip thereon in use.

I do not desire to be limited to the precise shape and dimensions of the device or its elements as the same may be modified within the scope of the appended claims.

The triangular end portion 11 of the blade is formed with a hole 23, which is useful in suspending the tool on a nail or hook.

I claim as my invention—

1. A corn knife formed with a blade having one margin broken up, a portion of said margin being blunt and a portion being beveled on one side only and a portion, between the other portions, being notched and beveled on both sides within the notch.

2. A corn knife formed with a blade having one margin beveled throughout its length and the other margin broken up, a portion of the latter margin being blunt and a portion being beveled on one side only and a portion, between the other portions being notched and beveled on both sides within the notch.

3. A corn knife formed with a blade having a point portion of greater width at its base than, and projecting from opposite sides of, the body of the blade, said blade also being formed with oppositely-beveled margins having oppositely-beveled curved ends merging into the point portion, whereby sharpened lifting hooks are formed in continuation of the margins of the blade.

Signed at Boone, in the county of Boone and State of Iowa, this 4th day of October, 1919.

JOSEPH JAMES FLEMING.